(12) United States Patent
Kiziltunc et al.

(10) Patent No.: US 7,873,902 B2
(45) Date of Patent: Jan. 18, 2011

(54) TRANSFORMATION OF VERSIONS OF REPORTS

(75) Inventors: Mehmet Kerem Kiziltunc, Frederiksburg C (DK); Anders Hauge, København (DK); Torben Wind Meyhoff, Frederikssund (DK)

(73) Assignee: Microsoft Corporation, Redmond, WA (US)

( * ) Notice: Subject to any disclaimer, the term of this patent is extended or adjusted under 35 U.S.C. 154(b) by 834 days.

(21) Appl. No.: 11/737,189

(22) Filed: Apr. 19, 2007

(65) Prior Publication Data

US 2008/0263440 A1 Oct. 23, 2008

(51) Int. Cl.
*G06F 17/00* (2006.01)
(52) U.S. Cl. .................................................. 715/255
(58) Field of Classification Search .............. 715/200, 715/255
See application file for complete search history.

(56) References Cited

U.S. PATENT DOCUMENTS

| | | | | |
|---|---|---|---|---|
| 5,835,758 | A * | 11/1998 | Nochur et al. ..................... 1/1 |
| 6,298,357 | B1 * | 10/2001 | Wexler et al. ................ 715/210 |
| 6,519,617 | B1 * | 2/2003 | Wanderski et al. ........... 715/235 |
| 6,687,873 | B1 * | 2/2004 | Ballantyne et al. ........... 715/215 |
| 6,834,048 | B1 * | 12/2004 | Cho et al. .................... 370/356 |
| 7,035,821 | B1 * | 4/2006 | Smith et al. ..................... 705/39 |
| 7,231,590 | B2 * | 6/2007 | Abbar et al. ................ 715/255 |
| 7,266,766 | B1 * | 9/2007 | Claussen et al. ............. 715/234 |
| 7,305,621 | B2 * | 12/2007 | Hays et al. ................... 715/255 |
| 7,564,969 | B2 * | 7/2009 | Cole ............................... 380/1 |
| 7,584,425 | B2 * | 9/2009 | Nader et al. ................. 715/255 |
| 7,624,341 | B2 * | 11/2009 | Salmon et al. .............. 715/255 |
| 7,793,217 | B1 * | 9/2010 | Kim et al. .................... 715/255 |
| 2001/0044811 | A1 * | 11/2001 | Ballantyne et al. .......... 707/513 |
| 2003/0033435 | A1 * | 2/2003 | Hanner ....................... 709/247 |
| 2003/0037303 | A1 * | 2/2003 | Bodlaender et al. ......... 715/523 |
| 2004/0133560 | A1 * | 7/2004 | Simske ........................... 707/3 |
| 2004/0143599 | A1 * | 7/2004 | Shalabi et al. ............. 707/104.1 |
| 2005/0022115 | A1 * | 1/2005 | Baumgartner et al. ....... 715/513 |
| 2005/0187890 | A1 * | 8/2005 | Sullivan ......................... 707/1 |
| 2006/0048048 | A1 * | 3/2006 | Welcker et al. .............. 715/513 |
| 2007/0011177 | A1 * | 1/2007 | Sol et al. ...................... 707/100 |
| 2007/0061118 | A1 * | 3/2007 | Friesner et al. ............... 703/11 |
| 2007/0136273 | A1 * | 6/2007 | Rehberg et al. ................ 707/5 |
| 2007/0143161 | A1 * | 6/2007 | Tien et al. ....................... 705/7 |
| 2007/0179975 | A1 * | 8/2007 | Teh et al. .................. 707/104.1 |
| 2008/0027957 | A1 * | 1/2008 | Bruckner et al. ............ 707/101 |
| 2008/0109250 | A1 * | 5/2008 | Walker et al. .................. 705/2 |
| 2009/0327277 | A1 * | 12/2009 | Sanborn et al. ................ 707/5 |

OTHER PUBLICATIONS

Bi Bi, Getting Started with Reporting Services, Google Mar. 26, 2004, pp. 1-28.*

* cited by examiner

*Primary Examiner*—Cong-Lac Huynh
(74) *Attorney, Agent, or Firm*—Marshall, Gerstein & Borun LLP

(57) ABSTRACT

A method of transforming reports from one version of software to another version is disclosed. The method exports existing report objects in an existing first version report into XML format to a transformation tool and then to a layout transformation tool. An XML object is created and is imported into a report in the second version.

15 Claims, 5 Drawing Sheets

TRANSFORMATION OF VERSIONS OF REPORTS

BACKGROUND

This Background is intended to provide the basic context of this patent application and it is not intended to describe a specific problem to be solved.

Software is constantly improving. From addressing comments from users to taking advantage of better technology, software continues to improve. As a result, new and improved versions of software are released. However, users have often become accustomed to using older versions of software and created numerous customizations of the software, changing to newer versions of software becomes a more challenging process as the customizations often do not carry over from one version of software to the next.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A method of transforming reports from one version of software to another version is disclosed. The method exports existing report objects in an existing first version report into XML format to a transformation tool. In the transformation tool, a report for the existing first version report is detected, mini-patterns within the existing first version report are detected, the existing first version report is tabularized, parts of the existing first version report are transformed into a series of instructions and a section part of the existing first version report is transformed into a RDLC (report definition language client) file in XML format.

DRAWINGS

DESCRIPTION

Although the following text sets forth a detailed description of numerous different embodiments, it should be understood that the legal scope of the description is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Figure 1:
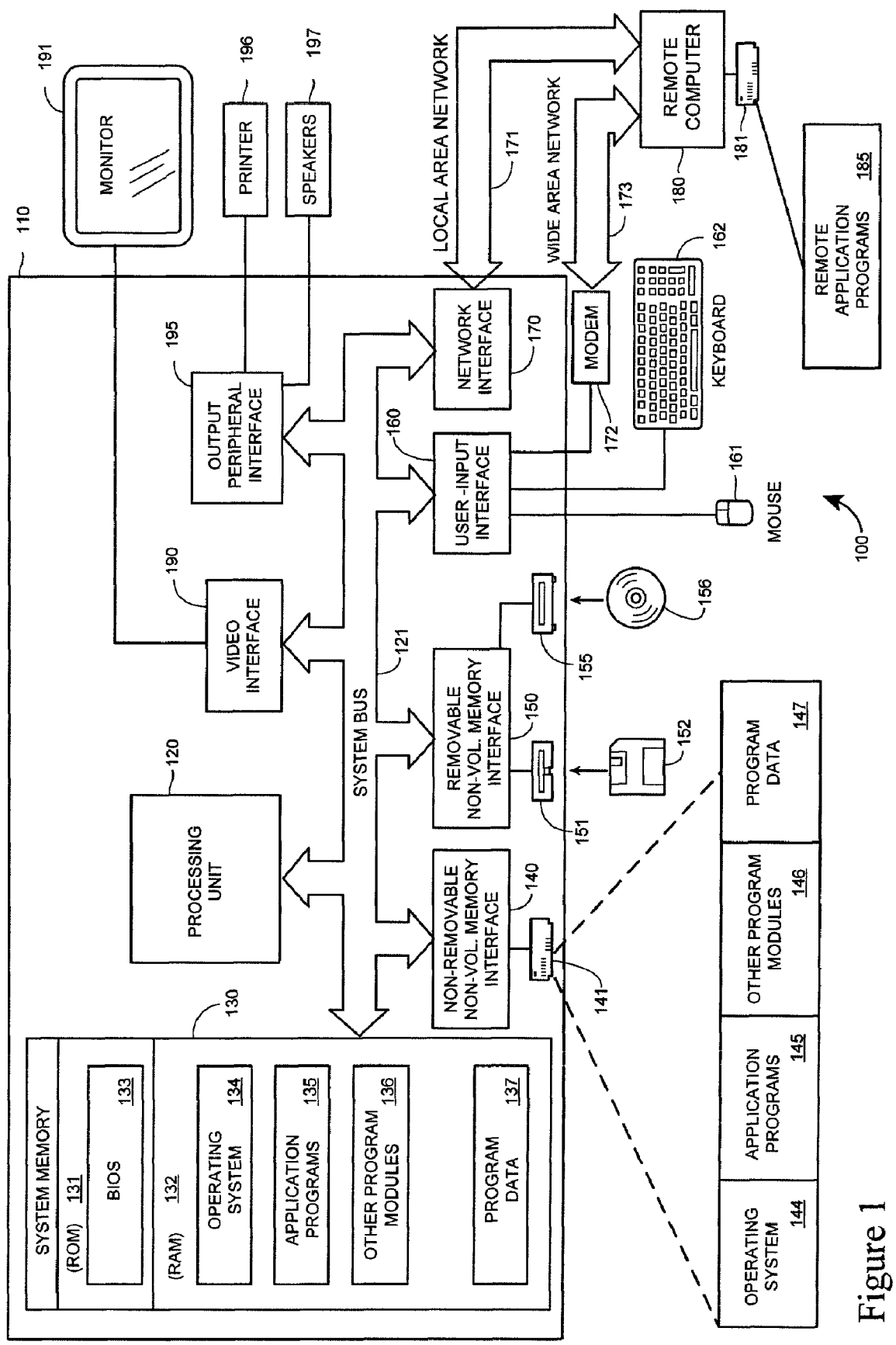
FIG. 1 is a block diagram of a computing system that may operate in accordance with the claims.

FIG. 1 illustrates an example of a suitable computing system environment 100 on which a system for the steps of the claimed method and apparatus may be implemented. The computing system environment 100 is only one example of a suitable computing environment and is not intended to suggest any limitation as to the scope of use or functionality of the method of apparatus of the claims. Neither should the computing environment 100 be interpreted as having any dependency or requirement relating to any one or combination of components illustrated in the exemplary operating environment 100.

The steps of the claimed method and apparatus are operational with numerous other general purpose or special purpose computing system environments or configurations. Examples of well known computing systems, environments, and/or configurations that may be suitable for use with the methods or apparatus of the claims include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The steps of the claimed method and apparatus may be described in the general context of computer-executable instructions, such as program modules, being executed by a computer. Generally, program modules include routines, programs, objects, components, data structures, etc. that perform particular tasks or implement particular abstract data types. The methods and apparatus may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the steps of the claimed method and apparatus includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus also known as Mezzanine bus, and the Peripheral Component Interconnect-Express (PCI-E).

Computer 110 (typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data strictures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Figure 2:
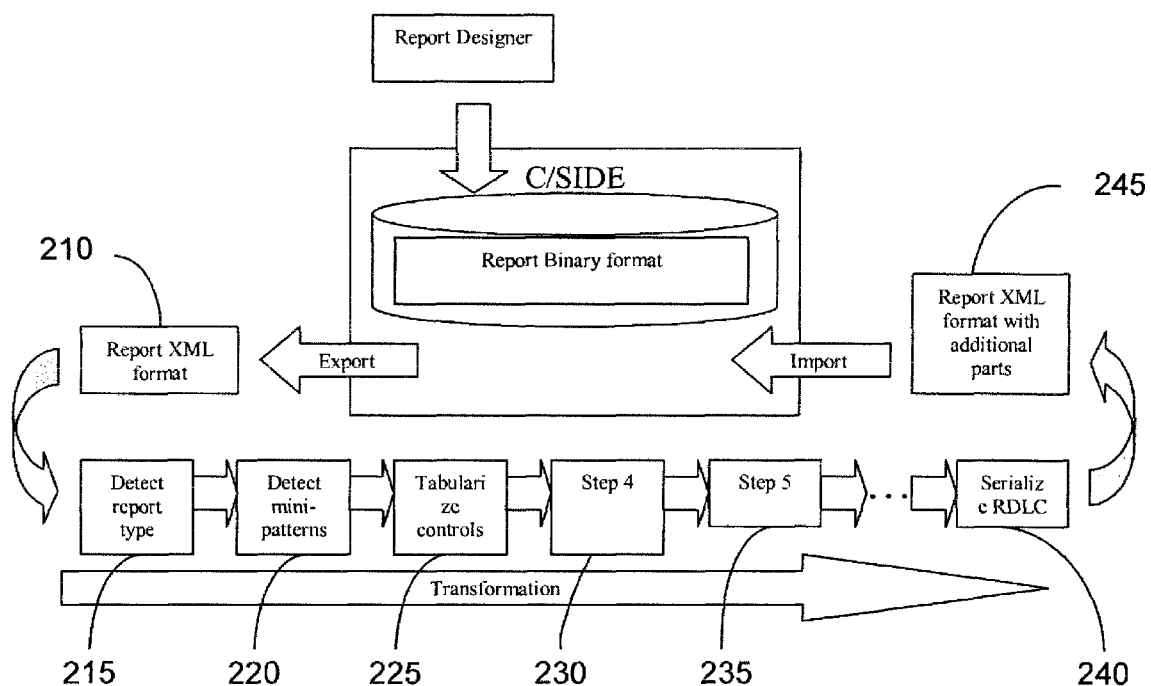
FIG. 2 is an illustration of a transforming a report from a first version to a second version.

FIG. 2 is a graphical representation of a method of transforming a report from a first version into a second version. The reports may be any report, including reports for financial reporting, enterprise resource planning programs ("ERP") or customer relationship management ("CRM") such as Dynamics NAV (formerly Navision) from Microsoft Corporation.

At block 210, existing report objects are exported in an existing first version report into XML format to a transformation tool. The report objects may be in any format, such as C/SIDE. Other formats in addition to XML may be possible.

At block 215, in the transformation tool, a report type for the existing first version report may be detected. Often times, reports may be created from templates and matching the report to a known type is straightforward. Other times, reports are modified and the determination of a report type may be more complicated. In some cases, a specific report type may be noted in the report file.

At block 220, mini-patterns may be determined within the existing first version report. The detection of mini patterns assists in identifying ways to efficient transform the report from a first version to a second version. The detection of mini-patterns may take many forms. In one embodiment, detecting mini-patterns entails examining properties of the existing first version report and determining if the properties of the first version report are similar to properties of known reports. Properties of the first report version may include the body of the first version report, the headers of the first version report and the groupings of the first version report. By examining the body, headers and groupings, the properties of the existing first report may be compared to the properties of known reports to see if the existing first report is or is related to a known report. For example, if a report only contains a header and a body section, the method may predict with great accuracy that the report is a list-style report. In another example, if the report contains a large header section with two address sections (sender and receiver address), the method may predict that the report is a Document style report.

In another embodiment, detecting mini-patterns entails examining parent-child relationships within the report and comparing the parent-child relationship to known parent-child relationships to determine if the parent-child relationship is similar to a known parent-child relationship. As an example, a balance sheet has a plurality of known parent-child relationship and these parent-child relationships may be used to predict the type of report. If there is a match, the report may be quickly classified.

In another embodiment, detecting mini-patterns entails examining the layout of fields in the report. For example, if a report contains multiple rows of fields in a columnar structure, and they all show very similar values, the method may detect that this is a Label style report for printing address labels for customers or vendors. In yet another embodiment, if the same field is used both in a body section and a group section, the method would predict that this is a "List with Groupings" style report with a list of entries and a summary line at the end.

At block 225, controls from the existing first version report are tabularized or put in tabular form. RDLC (report definition language-client) (which maybe represented as art in-memory object model or as an XML document) has a table concept with columns and rows that are used in reports. In previous versions of reports, controls that showed the various values were freely laid out on the report surface. In RDLC, most reports are created using a tabular format.

At block 230, parts of the existing first version report are transformed into a series of instructions. At a high level, reports may be broken into defined data sources and query information, along with data regions and fields on the report. Layout information and interactive features may also be included. These elements may be transformed into a series of instructions that are executed when the report is created, opened or updated. For example, data that is stored may be obtained first and fields which are dependent on the stored data may be filled in second, etc. In execution, transforming the parts of the existing first version report may include transforming request forms in the existing first version report into a request page.

Figure 3:
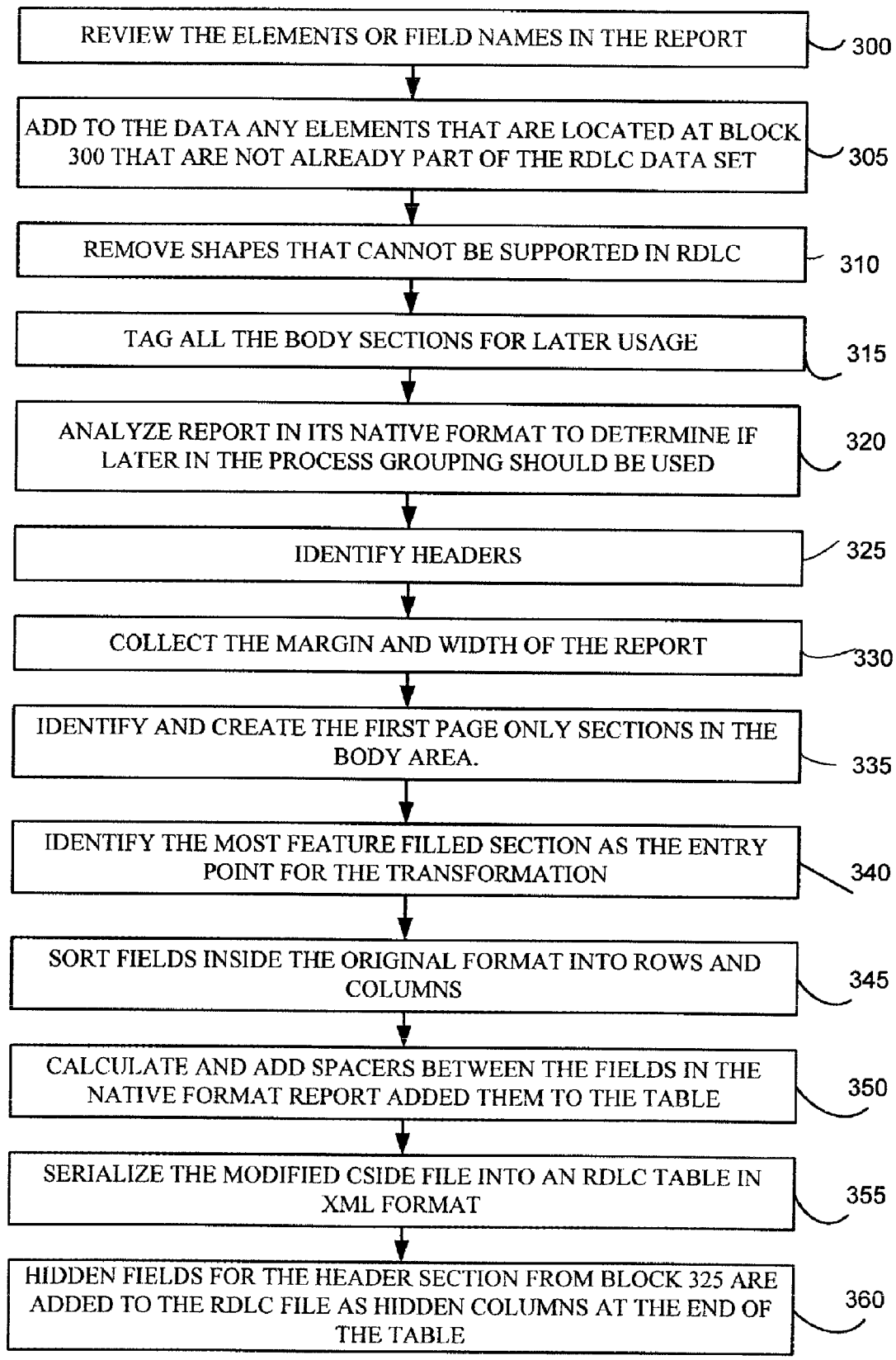
FIG. 3 illustrates how the transformation may occur.

More specifically, FIG. 3 illustrates how the transformation may occur. At block 300, the method may review the elements or field names in the report. The report may still be in its original format, such as C/Side. At block 305, any elements that are located at block 300 that are not already part of the RDLC data set may be added to the data schema. The RDLC designer may require a fixed dataset schema in order to perform a validation of the field names. By adding all the elements to the dataset schema, validation will occur. In addition, extra fields or elements may be added the dataset schema if the field can be more correctly implemented in RDLC rather than being calculated in the native format such as C/Side.

At block 310, shapes that cannot be supported in RDLC are removed from the transformation process. At block 315, all the body sections are tagged for later usage. At block 320, the report in its native format such as C/Side is analyzed to see if later in the process grouping should be used. If the analysis at block 320 is true that grouping are present, then the method may continue to a group transformation as described in FIG. 5.

At block 325, headers may be identified. Headers may be transformed differently than the body because headers are positioned with coordinates in C/Side, and in RDLC, the headers are fitted into a table. Headers may be found by looking at the first section of the report and looking for elements such as company name, date, time, user id, etc. The fields found in this analysis are added to a separate list because they need to receive their information from body elements and need a parallel field in the table. In one embodiment, the headers are added as hidden columns at the end of the RDLC table.

At block 330, the margin and width of the report are collected.

At block 335, the body of the report in its original format is reviewed. The first page only sections are identified and are created in the body area. As they are elements on top of the body table, they may be displayed only on the first page.

Figure 4:
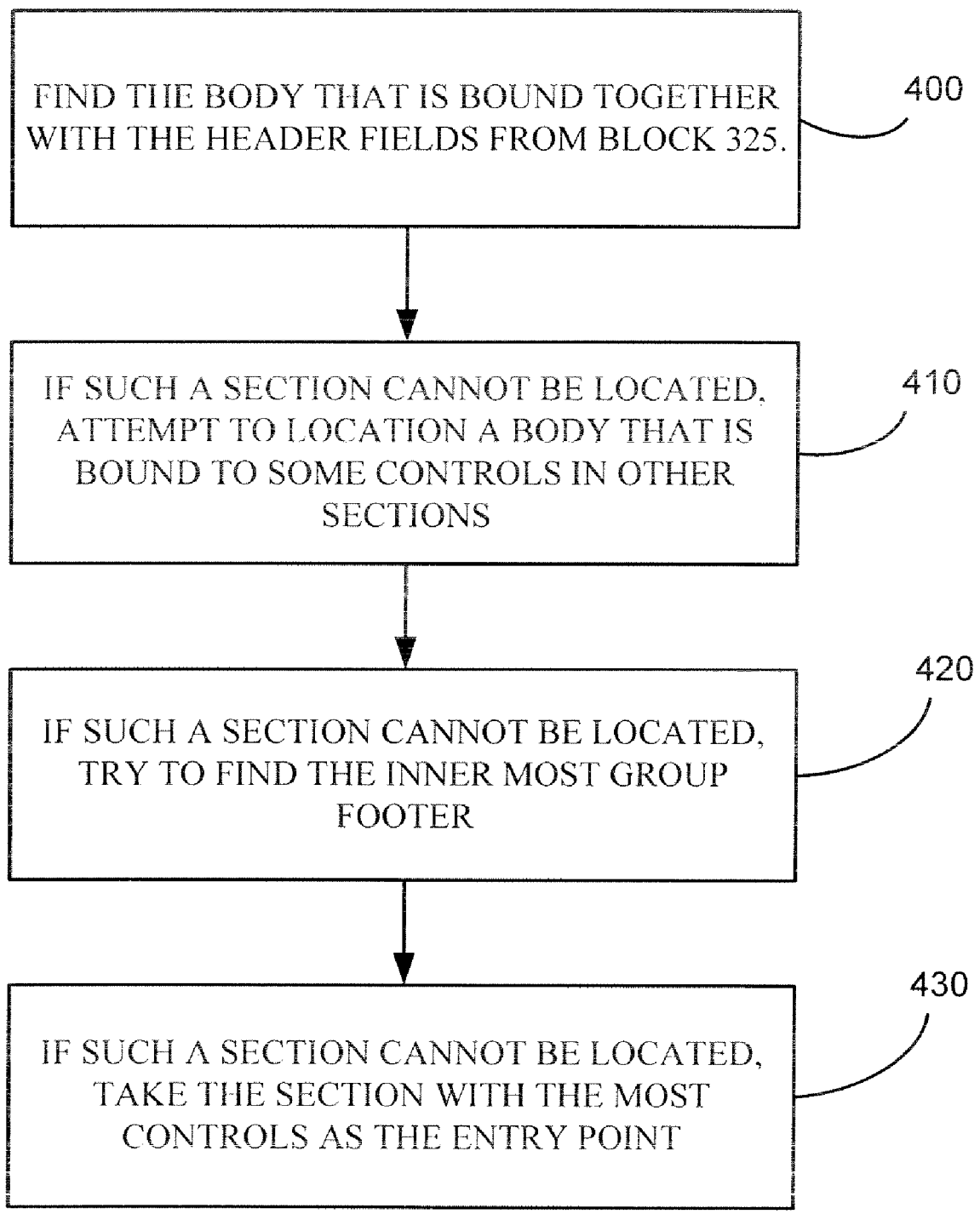
FIG. 4 illustrates one such evaluation methodology for finding the entry point section.

During transformation, only one body table is created. In order to make only one body table, at block 340, the most feature filled section is identified as the entry point for the transformation. Finding the entry point section may require an evaluation. FIG. 4 may be one such evaluation methodology.

At block 400, the method may attempt to find the body that is bound together with the header fields from block 325. If such a section is located, it may be used as the entry point. If such a section cannot be located, at block 410 the method may attempt to location a body that is bound to some controls in other sections. If such a section is located, it may be used as the entry point. If such a section cannot be located, at block 420, the method may try to find the inner most group footer. If such a section is located, it may be used as the entry point. If such a section cannot be located, at block 430, the method may take the section with the most controls as the entry point.

Referring again to FIG. 3, at block 345 fields inside the original format such as C/Side are sorted into rows and columns. In some formats such as C/Side, the fields are located using coordinates but in RDLC, the fields are located inside a table. The rows and columns make up a large table. At block 350, spacers between the fields in the native format report are calculated and are added to the table such that the report in RDLC will look like the report in the original format such as C/Side.

At block 355, the RDLC table is created by transforming the modified C/Side file into an RDLC table in an in-memory object model. At block 360, the hidden fields for the header section from 325 are added to the RDLC file as hidden columns at the end of the table. The RDLC in-memory object model is ready to be deserialized into RDLC Xml.

Referring again to FIG. 2, at block 235, the additional groupings may be added to the in-memory object model. The RDLC in in-memory object model may store the data until transformation is complete.

At block 240, the in-memory object model may be serialized into a RDLC file in XML format and at block 245, the files may be communicated to the updated version of the application. RDLC files may be created in a variety of ways. One way is to use the Visual Studio 2005 version of Report Designer. RDL and RDLC formats have the same XML schema. However, in RDLC files, some values (such as query text) are allowed to be empty, which means that they are not immediately ready to be published to a Report Server. The missing values may be entered by opening the RDLC file using the SQL Server 2005 version of Report Designer.

Some reporting services use a published, extensible XML schema called Report Definition Language (RDL) and RDLC is the client side version of RDL. The RDL format covers all aspects of the reports, including data retrieval, expressions, and layout. RDL is a set of instructions that describe layout and query information for a report. RDL is composed of Extensible Markup Language (XML) elements that conform to an XML grammar created for Reporting Services. RDL describes the XML elements, which encompass all possible variations that a report can assume. RDL promotes the interoperability of commercial reporting products by defining a common schema that enables the interchange of report definitions as a standard way of communicating using reports.

RDL is not a programmatic interface or protocol like HTTP or ODBC. It does not specify how report definitions are passed between applications or how reports are processed. Because RDL is fully encapsulated, you can write code that interprets an RDL document without having to know anything about the source application. Any protocol or programmatic interface that works with XML can be used with RDL. RDL is:

An XML schema for report definitions.

An interchange format for businesses and third parties.

An extensible and open schema that supports additional namespaces and custom elements.

Users may use the expression capabilities of RDL to support dynamic content within reports, designing conditional formatting and drill-down links. There are specific ways to generate RDL programmatically. One way to generate RDL from an application is to use the Microsoft .NET Framework classes of the System.Xml namespace. The XmlTextWriter class can write RDL according to the specification. However, a user may generate a complete report definition in any Microsoft .NET application. Because RDL is an open schema, it can be extended with additional attributes and elements. Users may even include custom report controls and elements that are not included with RDL and embed code inside the report definition. For example, a user may create and use maps, barcodes, and media clips within reports, and add the custom report controls to the Microsoft Visual Studio Toolbox. Custom report controls have their own properties and dialog boxes and use the expression evaluation, grouping, sorting, and filtering features of the Report Processor. As the RDLC file is XML schema, the report object is straightforward to make. The XML object may be imported into a report in the second version. As such, customizations that were made to the first version of the report will carry over into the second version of the report.

The report definition for a report contains elements that define the data and appearance of the report. A report definition file can contain additional elements that are not used by the report server. For example, Report Designer places an element in the report definition that is only used by Report Designer. The following are some of the elements in a sample RDL file.

| Element | Parent | Description |
|---|---|---|
| AccentSensitivity | DataSet | Indicates whether the data is accent-sensitive. |
| Action | DataPoint, Image, Textbox | Defines a hyperlink, bookmark link, or drillthrough action. |
| AllowBlank | ReportParameter | Indicates whether the value for the parameter can be an empty string. |
| Author | Report | Specifies the name of the person who created the report. |
| AutoRefresh | Report | Specifies the rate, in seconds, at which a report rendered in HTML refreshes. |
| Axis | CategoryAxis, ValueAxis | Defines properties for labels, titles, and gridlines on an axis. |
| BackgroundColor | Style | Describes the background color of the item. |
| BackgroundGradientEndColor | Style | Specifies the end color of the background gradient. |
| BackgroundGradientType | Style | Specifies the type of background gradient. |
| BackgroundImage | Style | Provides information about the background image. |
| BackgroundRepeat | BackgroundImage | Indicates how the background image fills the available space. |
| Body | Report | Contains the visual elements of the report. |
| Bookmark | Chart, Image, Line, List, Matrix, Rectangle, Subreport, Table, Textbox | Provides a bookmark that users can jump to using a link defined as a bookmark action. |

-continued

| Element | Parent | Description |
| --- | --- | --- |
| BookmarkLink | Action | Contains the ID of a bookmark within the report. |
| BorderColor | Style | Indicates the border color of the item. |
| BorderStyle | Style | Indicates the style of the border of the item. |
| BorderWidth | Style | Indicates the width of the border of the item. |
| Bottom | BorderColor | Describes the color of the bottom border of the item. |
| Bottom | BorderStyle | Describes the style of the bottom border of the item. |
| Bottom | BorderWidth | Describes the width of the bottom border of the item. |
| BottomMargin | Report | Describes the width of the bottom margin of the report. |
| Calendar | Style | Specifics the calendar to use to format dates. |
| CanGrow | Textbox | Indicates whether the size of the text box can increase according to its content. |
| CanShrink | Textbox | Indicates whether the size of the text box can decrease according to its content. |
| Caption | Title | Contains the text of the title. |
| CaseSensitivity | DataSet | Indicates whether the data is case-sensitive. |
| CategoryAxis | Chart | Defines the category axis of the chart. |
| CategoryGrouping | CategoryGroupings | Defines a category level for a category grouping in a chart. |
| CategoryGroupings | Chart | Defines a set of category groupings for the chart. |
| CellDataElementName | Matrix | Contains the name of the data element for a matrix cell in a report rendered using a data rendering extension, such as XML or CSV. |
| CellDataElementOutput | Matrix | Indicates whether the matrix cell appears in output rendered by the XML rendering extension. |
| Chart | ReportItems | Defines a chart region to be included in the report. |
| ChartData | Chart | Defines the data values for the chart. |
| ChartElementOutput | Chart | Indicates whether the element containing the chart data points appears in output rendered by the XML rendering extension. |
| ChartSeries | Chart | Defines a set of data points for a series. |
| Class | Classes | Contains information about a class to instantiate. |
| Classes | Report | Contains classes to instantiate during report initialization. |
| ClassName | Class | Contains the name of the class to instantiate. |
| Clustered | ThreeDProperties | Indicates whether the data series are displayed along distinct rows in a three-dimensional chart. |
| Code | Report | Contains definitions for custom functions to be used in the report. |
| CodeModule | CodeModules | Contains the name of the code module to load. |
| CodeModules | Report | Contains the names of code modules to load for use in expressions. |
| Collation | DataSet | Describes the locale that the report server uses to sort data. |
| Color | Style | Describes the foreground color of the item. |
| ColSpan | TableCell | Indicates the number of columns that the table cell spans. |
| ColumnGrouping | ColumnGroupings | Defines a column header region in a matrix. |

-continued

| Element | Parent | Description |
| --- | --- | --- |
| ColumnGroupings | Matrix | Contains the set of column groupings for a matrix. |
| Columns | Body | Defines the default number of columns in the report. |
| ColumnSpacing | Body | Defines the spacing between each column. |
| CommandText | Query | Specifies the query that the report server executes to retrieve data for the report. |
| CommandType | Query | Indicates the type of query that is contained in the CommandText element. |
| ConnectionProperties | DataSource | Provides information about the data source. |
| ConnectString | ConnectionProperties | Contains the connection string for the data source. |
| Corner | Matrix | Contains the items in the corner region of a matrix. |
| CrossAt | Axis | Indicates the value at which to cross the other axis. |
| Custom | Chart, Grouping, Image, Line, List, Matrix, Rectangle, Report, Subreport, Table, Textbox | Contains custom information to be passed to the rendering extension. |
| CustomReportItem | ReportItems | Defines a custom report item to be drawn in the report. |
| DataCollectionName | Grouping | Contains the name of the data element of the collection containing all instances of the group in a report rendered using a data rendering extension, such as XML or CSV. |
| DataElementName | Chart, CustomReportItem, DataPoint, Grouping, Image, Line, List, Matrix, Rectangle, Report, Subreport, Subtotal, Table, Textbox | Contains the name of the data element or attribute for a report item or the name of the top-level element for a report rendered using a data rendering extension, such as XML or CSV. |
| DataElementOutput | Chart, CustomReportItem, DataPoint, Grouping, Image, Line, List, Matrix, Rectangle, Subreport, Subtotal, Table, Textbox | Indicates whether the item appears in output rendered by the XML rendering extension. |
| DataElementStyle | Report, Textbox | Indicates whether a text box within the report should be rendered as an element or as an attribute when the report is rendered using a data rendering extension, such as XML or CSV. |
| DataInstanceElementOutput | List | Indicates whether the list appears in output rendered by the XML rendering extension. |
| DataInstanceName | List | Contains the name of the data element for a list in a report rendered using a data rendering extension, such as XML or CSV. |
| DataField | Field | Name of a field in a query. |
| DataLabel | DataPoint | Defines the data labels to display for data values. |
| DataPoint | DataPoints | Defines a single data point for a chart. |
| DataPoints | ChartSeries | Defines the data points for a chart series. |
| DataProvider | ConnectionProperties | Specifies the data processing extension to use for the data source. |
| DataSchema | Report | Contains the namespace to use in a report rendered using a data rendering extension, such as XML or CSV. |

-continued

| Element | Parent | Description |
|---|---|---|
| DataSet | DataSets | Contains information about a dataset used in the report. |
| DataSetName | DataSetReference | Indicates which dataset to use for the dataset reference. |
| DataSetName | List, Matrix, Chart, Table | Indicates which dataset to use for the data region. |
| DataSetReferenee | DefaultValue, ValidValues | Defines a dataset that contains a list of valid parameter values and for a default parameter. |
| DataSets | Report | Describes the data in the report. |
| DataSource | DataSources | Describes a source of data for the report. |
| DataSourceName | Query | Contains the name of the data source for the query. |
| DataSourceReference | DataSource | Contains the path to a shared data source. |
| DataSources | Report | Describes the data sources for the report. |
| DataTransform | Report | Contains the location and file name of a transformation to apply to a report rendered using a data rendering extension, such as XML or CSV. |
| DataType | ReportParameter | Specifies the data type of a parameter. |
| DataValue | DataValues | Defines a single value for a data point. |
| DataValues | DataPoint | Contains a set of data values for the y-axis. |
| Default | BorderColor | Describes the default color of the border of the item. |
| Default | BorderStyle | Describes the default style of the border of the item. |
| Default | BorderWidth | Describes the default width of the border of the item. |
| DefaultValue | ReportParameter | Specifies the default value to use for the parameter. |
| DepthRatio | ThreeDProperties | Indicates the ratio of height to width. |
| Description | Report | Provides a long description of the report. |
| DetailDataCollectionName | Table | Contains the name of the data element of the collection containing all instances of the group in a report rendered using a data rendering extension, such as XML or CSV. |
| DetailDataElementName | Table | Contains the name of the data element for instances of the group in a report rendered using a data rendering extension, such as XML or CSV. |
| DetailDataElementOutput | Table | Indicates whether the details appear in output rendered by the XML rendering extension. |
| Details | Table | Defines the details rows for a table. |
| Direction | SortBy | Indicates whether the items are sorted in ascending or descending order. |
| Direction | Style | Specifies the direction of text and matrices. |
| DrawingStyle | ThreeDProperties | Specifies shape of the columns or bars in a three-dimensional chart. |
| Drillthrough | Action | Contains a reference to a report to be opened through a drillthrough action. |
| DynamicCategories | CategoryGrouping | Defines the a category level that repeats with each category group in a chart. |
| DynamicColumns | ColumnGrouping | Defines dynamic column headings for a grouping. |
| DynamicRows | RowGrouping | Defines dynamic row headings for a grouping. |

-continued

| Element | Parent | Description |
| --- | --- | --- |
| DynamicSeries | SeriesGrouping | Defines a series level that repeats with each series group in a chart. |
| EmbeddedImage | EmbeddedImages | Contains an image that is embedded within a report. |
| EmbeddedImages | Report | Contains the images that are embedded within a report. |
| Enabled | ThreeDProperties | Indicates whether the chart is three-dimensional. |
| Field | Fields | Describes a field in the dataset. |
| Fields | DataSet | Contains the fields in the dataset. |
| Filter | Filters | Contains a list of filters that restrict rows of data in a dataset or data region, or restrict group instances in a grouping. |
| FilterExpression | Filter | Contains an expression that is evaluated for each row of data or group. |
| Filters | Chart, DataSet, Grouping, List, Matrix, Table | Contains a collection of filter lists to apply to a dataset, data region, or grouping. |
| FilterValue | FilterValues | Contains a value to compare against a filter expression. |
| FilterValues | Filter | Contains a collection of values to compare against a filter expression. |
| FontFamily | Style | Contains the name of the font for the item. |
| FontSize | Style | Indicates the point size of the font for the item. |
| FontStyle | Style | Indicates the style of the font for the item. |
| FontWeight | Style | Indicates the weight of the font for the item. |
| Footer | Table, TableGroup | Defines the footer rows for a table or group. |
| Format | Style | Contains the Microsoft .NET Framework formatting string for the item. |
| GapDepth | ThreeDProperties | Indicates the percent depth gap between three-dimensional bars and columns. |
| GroupExpression | GroupExpressions | Defines an individual expression by which to group the data. |
| GroupExpressions | Grouping | Contains an ordered list of expressions by which to group the data. |
| Grouping | Details, DynamicCategories, DynamicColumns, DynamicRows, DynamicSeries, List, TableGroup | Defines how the data is grouped. |
| GroupsBeforeRowHeaders | Matrix | Indicates the number of instances of the outermost column group to appear outside the row headers. |
| Header | Table, TableGroup | Defines the header rows for a table or group. |
| Height | Body, Chart, ColumnGrouping, CustomReportItem, Details, Footer, Header, Image, Line, List, Matrix, MatrixRow, PageFooter, PageHeader, Rectangle, Subreport, Table, Textbox | Indicates the height of the item. |
| HeightRatio | ThreeDProperties | Indicates the ratio of height to width. |
| Hidden | Visibility | Indicates whether the item should initially be shown on the report. |

-continued

| Element | Parent | Description |
| --- | --- | --- |
| HideDuplicates | Textbox | Indicates whether an item is displayed when its current value is the same as its value in the previous row. |
| Hyperlink | Action | Contains the URL of the target object. |
| Image | ReportItems | Contains an image to be displayed in the report. |
| ImageData | EmbeddedImage | Contains encoded image data. |
| Inclination | ThreeDProperties | Indicates the angle of inclination. |
| InitialState | ToggleImage | Determines the initial state of the toggle image. |
| InsidePlotArea | Legend | Indicates whether the legend is drawn inside the plot area of a chart. |
| InstanceName | Class | Contains the name of the variable to which the class is assigned. |
| IntegratedSecurity | ConnectionProperties | Indicates whether the data source uses integrated security to connect. |
| InteactiveHeight | Report | Specifies the default height of a report that is rendered in the HTML or GDI rendering extensions. |
| InteactiveWidth | Report | Specifies the default height of a report that is rendered in the HTML or GDI rendering extensions. |
| Interlaced | Axis | Indicates whether alternating dark stripes are drawn between grid lines. |
| KanatypeSensitivity | DataSet | Indicates whether the data is kanatype-sensitive. |
| KeepTogether | Chart, List, Matrix, Table | Indicates whether all sections of the data region are kept together on one page. |
| Label | DynamicCategories, DynamicSeries, StaticMember | Provides a label for items in a chart. |
| Label | ParameterValue | Contains the label to display to the user for the parameter. |
| Label | Chart, Grouping, Image, Line, List, Matrix, Rectangle, Subreport, Table, Textbox | Provides a user-friendly label for an instance of an item within a report. |
| LabelField | DataSetReference | Contains the name of the field that displays a parameter value to the user. |
| Language | Report | Indicates the primary language of the text in the report. |
| Language | Style | Indicates the primary language of the text. |
| Layout | Legend | Determines the arrangement of labels within the legend. |
| LayoutDirection | Matrix | Indicates whether matrix columns read left-to-right or right-to-left. |
| Left | BorderColor | Describes the color of the left border of the item. |
| Left | BorderStyle | Describes the style of the bottom border of the item. |
| Left | BorderWidth | Describes the width of the left border of the item. |
| Left | Chart, CustomReportItem, Image, Line, List, Matrix, Rectangle, Subreport, Table, Textbox | Indicates the distance of the item from the left of the containing item. |
| LeftMargin | Report | Specifies the width of the left margin of the report. |
| Legend | Chart | Defines the chart legend. |
| Line | ReportItems | Defines a line to be drawn in the report. |

| Element | Parent | Description |
| --- | --- | --- |
| LineHeight | Style | Describes the height of a line of text. |
| LinkToChild | Rectangle | Contains the name of a child report item that is the target location for the document map label. |
| List | ReportItems | Defines a list region to be included in the report. |
| LogScale | Axis | Indicates whether the axis is logarithmic. |
| MajorGridLines | Axis | Defines the major grid lines in the chart. |
| MajorInterval | Axis | Indicates the interval between major gridlines on an axis. |
| MajorTickMarks | Axis | Indicates the position of the major tick marks on the axis. |
| Margin | Axis | Indicates whether the chart contains an axis margin. |
| Marker | DataPoint | Defines a marker for displayed chart data values. |
| Matrix | ReportItems | Defines a grid of regions that repeats with each column group and row group. |
| MatrixCell | MatrixCells | Defines the contents of each detail cell in a matrix. |
| MatrixCells | MatrixRow | Defines the set of cells in a row of the detail section of a matrix. |
| MatrixColumn | MatrixColumns | Defines a column in the detail section of a matrix. |
| MatrixColumns | Matrix | Defines a set of columns in the detail section of a matrix. |
| MatrixRow | MatrixRows | Defines a row in the detail section of a matrix. |
| MatrixRows | Matrix | Defines the set of rows in the detail section of a matrix. |
| Max | Axis | Indicates the maximum value of the axis. |
| MergeTransactions | Subreport | Indicates whether transactions in the subreport are merged with transactions in the parent report when both reports use the same data sources. |
| MIMEType | BackgroundImage, EmbeddedImage, Image | Identifies the Multipurpose Internet Mail Extensions (MIME) type of the image. |
| Min | Axis | Indicates the minimum value of the axis. |
| MinorGridLines | Axis | Defines the minor grid lines in the chart. |
| MinorInterval | Axis | Indicates the interval between minor gridlines on an axis. |
| MinorTickMarks | Axis | Indicates the position of the minor tick marks on the axis |
| NoRows | Chart, List, Matrix, Subreport, Table | Specifies the text to display when no rows are returned by the datasets in a subreport or data region. |
| Nullable | ReportParameter | Indicates whether the value for the parameter can be null. |
| NumeralLanguage | Style | Specifies the language to use to format numbers. |
| NumeralVariant | Style | Specifies the language variant to use to format numbers. |
| Omit | Parameter | Indicates that the parameter is ignored when a user opens a report using a drillthrough link on another report. |
| Operator | Filter | Specifies an operator by which to compare the values in the FilterExpression and FilterValues elements. |
| PaddingBottom | Style | Designates the amount of padding below the item. |
| PaddingLeft | Style | Designates the amount of padding to the left of the item. |
| PaddingRight | Style | Designates the amount of padding to the right of the item. |

-continued

| Element | Parent | Description |
| --- | --- | --- |
| PaddingTop | Style | Designates the amount of padding above the item. |
| PageBreakAtEnd | Chart, Grouping, List, Matrix, Rectangle, Table | Indicates that the rendering extension should insert a page break at the end of the item. |
| PageBreakAtStart | Chart, Grouping, List, Matrix, Rectangle, Table | Indicates that the rendering extension should insert a page break at the beginning of the item. |
| PageFooter | Report | Contains a footer that is rendered at the bottom of each page of the report. |
| PageHeader | Report | Contains a header that is rendered at the top of each page of the report. |
| PageHeight | Report | Specifies the default height of the report. |
| PageWidth | Report | Specifies the default width of the report. |
| Palette | Chart | Specifies the color palette for chart items. |
| Parameter | Parameters | Contains a parameter to pass to a report or control. |
| Parameters | Drillthrough, Subreport | Contains a list of parameters to pass to the report or control. |
| ParameterValue | ParameterValues | Provides a hard-coded value for a parameter. |
| ParameterValues | ValidValues | Provides a list of hard-coded values for a parameter. |
| Parent | Grouping | Identifies the parent group in a recursive hierarchy. |
| Perspective | ThreeDProperties | Indicates the percent of perspective. |
| PlotArea | Chart | Defines properties for the plot area of chart types with x- and y-axes. |
| PlotType | ChartSeries | Indicates whether the series is plotted as a line on a column chart. |
| PointWidth | Chart | Specifies the width of columns and bars in a chart. |
| Position | DataLabel | Indicates the position of the data label. |
| Position | Legend | Indicates the position of the legend. |
| Position | Subtotal | Indicates whether the subtotal rows or columns appear before or after the details rows or columns. |
| Position | Title | Indicates the position of the title. |
| PrintOnFirstPage | PageFooter, PageHeader | Indicates whether the page header is rendered on the first page of the report. |
| PrintOnLastPage | PageFooter, PageHeader | Indicates whether the page header is rendered on the last page of the report. |
| ProjectionMode | ThreeDProperties | Specifies the projection mode for the three-dimensional chart. |
| Prompt | ConnectionProperties | Contains the text that the user interface displays when prompting the user for database credentials. |
| Prompt | ReportParameter | Designates the text to display when the user interface prompts the user for parameter values. |
| Query | DataSet | Contains query information for the dataset. |
| QueryParameter | QueryParameters | Contains information about an individual parameter that is passed to the data source as part of a query. |
| QueryParameters | Query | Contains a list of parameters to pass to the data source. |
| Rectangle | ReportItems | Defines a rectangle to be drawn in the report. |

-continued

| Element | Parent | Description |
|---|---|---|
| RepeatOnNewPage | Footer, Header | Indicates whether the header or footer should be displayed with the table on each page. |
| RepeatWith | Image, Line, Rectangle, Textbox | Provides the name of the data region with which to repeat the report item if the data region spans multiple pages. |
| Report | (none) | Top-level element of the report. |
| ReportItems | Body, Corner, DynamicColumns, DynamicRows, List, MatrixCell, PageFooter, PageHeader, Rectangle, StaticColumn, StaticRow, Subtotal, TableCell | Contains the report items that define the contents of a report region. |
| ReportName | Drillthrough, Subreport | Contains the path and name of the target report. |
| ReportParameter | ReportParameters | Describes an individual parameter in the report. |
| ReportParameters | Report | Contains an ordered list of parameters in the report. |
| Reverse | Axis | Indicates whether the axis direction is reversed. |
| Right | BorderColor | Describes the color of the right border of the item. |
| Right | BorderStyle | Describes the style of the right border of the item. |
| Right | BorderWidth | Describes the width of the right border of the item. |
| RightMargin | Report | Specifics the width of the right margin of the report. |
| Rotation | DataLabel, ThreeDProperties | Indicates the angle of rotation. |
| RowGrouping | RowGroupings | Defines a row header region in a matrix. |
| RowGroupings | Matrix | Contains the set of row groupings for a matrix. |
| Scalar | Axis | Indicates whether the values on the axis are scalar. |
| SeriesGrouping | SeriesGroupings | Defines a series level for a series grouping in a chart. |
| SeriesGroupings | Chart | Defines a set of series groupings for the chart. |
| Shading | ThreeDProperties | Defines the shading of the three-dimensional chart. |
| ShowGridLines | MajorGridLines, MinorGridLines | Indicates whether gridlines are displayed in the chart. |
| Size | Marker | Indicates the size of the marker. |
| Sizing | Image | Determines the appearance of the image if it does not fit within the height and width of the Image element. |
| SortBy | Sorting | Defines an individual expression by which to sort the data. |
| SortExpression | SortBy | Contains the expression by which to sort the data. |
| Sorting | Details, DynamicColumns, DynamicRows, List, TableGroup | Defines how to sort the data. |
| Source | BackgroundImage, Image | Indicates the source of the image. |
| StaticCategories | CategoryGrouping | Defines a category level with a fixed set of members. |
| StaticColumn | StaticColumns | Defines a fixed column header region in a matrix. |
| StaticColumns | ColumnGrouping | Defines static column headings for the grouping. |
| StaticMember | StaticCategories, StaticSeries | Defines a label to display for a static series or category member. |
| StaticRow | StaticRows | Defines a fixed row header region in a matrix. |
| StaticRows | RowGrouping | Defines static headings for the grouping. |

-continued

| Element | Parent | Description |
|---|---|---|
| StaticSeries | SeriesGrouping | Defines a series level with a fixed set of members. |
| Style | Axis, Body, Chart, DataLabel, DataPoint, Image, Legend, Line, List, MajorGridLines, Marker, Matrix, MinorGridLines, PageFooter, PageHeader, PlotArea, Rectangle, Subreport, Subtotal, Table, Textbox | Contains information about the style of an item. |
| Subreport | ReportItems | Contains information about a report to be included within the report. |
| Subtotal | DynamicColumns, DynamicRows | Defines a subtotal column or row to be included in the matrix. |
| Subtype | Chart | Indicates the subtype of the chart. |
| Table | ReportItems | Defines a table to be included in the report. |
| TableCell | TableCells | Defines the contents of each cell in the table. |
| TableCells | TableRow | Defines a set of cells in a table. |
| TableColumn | TableColumns | Defines a column in a table. |
| TableColumns | Table | Contains a set of columns in a table. |
| TableGroup | TableGroups | Defines a group in a table. |
| TableGroups | Table | Contains a set of groups in a table. |
| TableRow | TableRows | Defines a row in a table. |
| TableRows | Header, Footer, Details | Contains an ordered list of table rows. |
| TextAlign | Style | Describes the horizontal alignment of the text of the item. |
| Textbox | ReportItems | Defines a text box to be drawn in the report. |
| TextDecoration | Style | Describes special text formatting for the item. |
| ThreeDProperties | Chart | Defines a the three-dimensional properties of a chart. |
| Timeout | Query | specifies the number of seconds the query runs before timing out. |
| Title | Axis, Chart | Contains the title of the item. |
| ToggleImage | Textbox | Indicates that a toggle image is displayed as a part of the text box. |
| ToggleItem | Visibility | Specifies the text box that users click to show or hide current item. |
| ToolTip | Chart, Image, List, Matrix, Rectangle, Subreport, Table, Textbox | Contains a text label for the item. |
| Top | BorderColor | Describes the color of the top border of the item. |
| Top | BorderStyle | Describes the style of the top border of the item. |
| Top | BorderWidth | Describes the width of the top border of the item. |
| Top | Chart, CustomReportItem, Image, Line, List, Matrix, Rectangle, Subreport, Table, Textbox | Indicates the distance of the item from the top of the containing item. |
| TopMargin | Report | Specifies the top margin of the report. |
| Transaction | DataSource | Indicates that the datasets using the data source should be executed in a single transaction. |
| Type | Chart | Indicates the type of the chart. |
| Type | Marker | Indicates the type of the marker. |
| UnicodeBiDi | Style | Indicates the level of bi-directional embedding. |

-continued

| Element | Parent | Description |
| --- | --- | --- |
| UsedInQuery | ReportParameter | Indicates whether a report parameter is used in queries within the report. |
| ValidValues | ReportParameter | Provides a list of possible values for a parameter. |
| Value | DataLabel | Contains the expression for the value labels. |
| Value | DataValue | Contains the value of the data point. |
| Value | Field | Contains an expression that evaluates to the value of the field. |
| Value | Image, BackgroundImage | Identifies the source of the image. |
| Value | Parameter | Contains the value for an individual parameter that is passed to a report or control. |
| Value | ParameterValue | Contains a possible value for the parameter. |
| Value | QueryParameter | Contains the value to pass to the data source. |
| Value | Textbox | Contains the value of the text box. |
| Value | Values | Contains the default value for a parameter. |
| ValueAxis | Chart | Defines the value axis of the chart. |
| ValueField | DataSetReference | Contains the name of the field that provides the valid values or the default value of the parameter. |
| Values | DefaultValue | Contains the hard-coded default values for the parameter. |
| VerticalAlign | Style | Describes the vertical alignment of the text of the item. |
| Visibility | Chart, CustomReportItem, Details, DynamicColumns, DynamicRows, Image, Line, List, Matrix, Rectangle, Subreport, Table, TableColumn, TableGroup, TableRow, Textbox | Indicates whether the item is displayed in the rendered report. |
| Visible | Axis, DataLabel, Legend | Indicates whether the item is displayed in the chart. |
| WallThickness | ThreeDProperties | Indicates the percent thickness of the outer walls of the three-dimensional chart. |
| Width | Chart, CustomReportItem, Image, Line, List, Matrix, MatrixColumn, Rectangle, Report, RowGrouping, Subreport, Table, TableColumn, Textbox | Indicates the width of the item. |
| WidthSensitivity | DataSet | Indicates whether the data is width-sensitive. |
| WritingMode | Style | Indicates whether the text is written horizontally or vertically. |
| ZIndex | Chart, CustomReportItem, Image, Line, List, Matrix, Rectangle, Subreport, Table, Textbox | Indicates the drawing order of the item within the containing item. |

Figure 5:
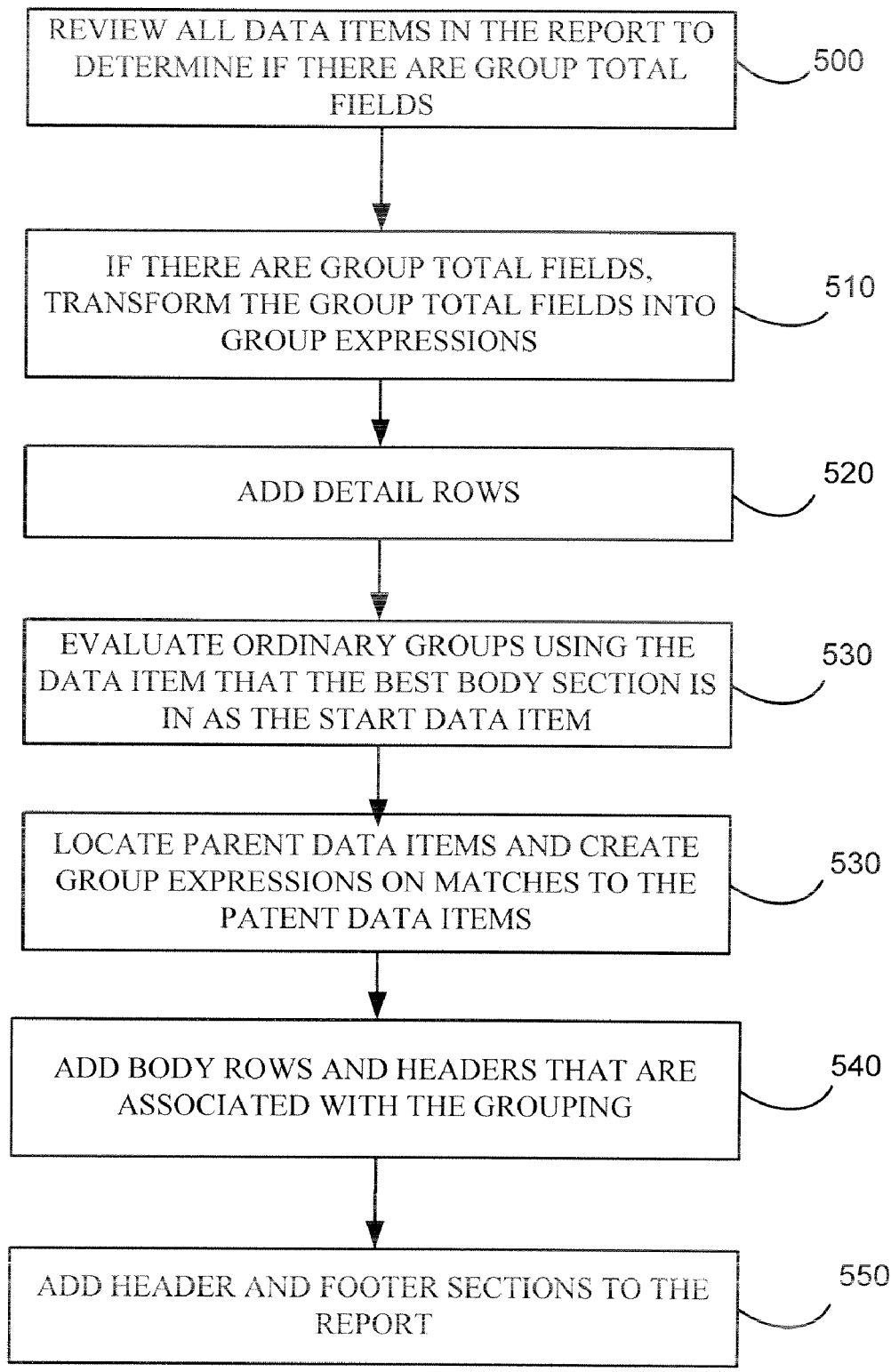
FIG. 5 illustrates how a group transformation may be performed.

FIG. 5 may be an illustration of group transformation one embodiment of how a group transformation may be performed. At block 500, all data items in the report may be reviewed to see if there are group total fields. If there are group total fields, at block 510, the method may transform the group total fields into group expressions. Also, at block 520, detail rows may be added and control may pass to block 530. If there are no group total fields, control may pass to block 530. At block 530, ordinary groups are evaluated. The start data item may be the data item that the best body section is in. At block 540, parent data items may be located and group expressions may be created on matches to the patent data items. At block 550, body rows and headers are added that are associated with the grouping. This process is executed for all parent relations. At block 560, header and footer sections may be added to the report and the table is ready to be deserialized into RDLC XML.

In use, the transformation may be made by accomplished by making a selection on a menu. For example, a user may select a "convert reports" tab and reports in Navision 5.1 may be listed. The user may select one, some or all of the listed reports to be converted. Once selected, the reports may be converted without further input from the user. In one embodiment, the user may be requested to indicate where to store the transformed reports.

Although the forgoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, it not impossible. Numerous alternative embodiments could be implemented, using either current technology or technology developed after the filing date of this patent, which would still fall within the scope of the claims.

Thus, many modifications and variations may be made in the techniques and structures described and illustrated herein without departing from the spirit and scope of the present claims. Accordingly, it should be understood that the methods and apparatus described herein are illustrative only and are not limiting upon the scope of the claims.

The invention claimed is:

1. A method of transforming a report from a first version to a second version comprising:
   exporting existing report objects in an existing first version report into XML format to a transformation tool;
   in the transformation tool,
      detecting mini-patterns within the existing first version report wherein detecting mini-patterns further comprises examining parent-child relationships within the report and comparing the parent-child relationship to known parent-child relationships to determine if the parent-child relationship is similar to a known parent-child relationship if there is a match, the type of the report is determined based on the type of the report having the known parent-child relationship;
      tabularizing controls from the existing first version report;
      transforming parts of the existing first version report comprising:
         building an in-memory object model for parts of the existing first version report; and
         serializing the in-memory object model into a report definition language client (RDLC) file in XML format.

2. The method of claim 1, wherein transforming the parts of the existing first version report further comprises transforming request forms in the existing first version report into a request page.

3. The method of claim 1, wherein detecting mini-patterns further comprises examining properties of the existing first version report and determining if the properties of the first version report are similar to properties of known reports.

4. The method of claim 3, wherein parts of the existing first report version comprise at least one selected from the group comprising:
   the body of the first version report;
   the headers of the first version report; and
   the groupings of the first version report.

5. The method of claim 1, wherein detecting mini-patterns further comprises examining the headings within the existing report to determine if the headings match any known headings.

6. The method of claim 1, wherein detecting mini-patterns further comprising examining the existing report for keywords to determine if the keywords match any known keywords.

7. The method of claim 1, wherein detecting mini-patterns further comprising examining the existing report for calculation patterns.

8. The method of claim 1, wherein detecting mini-patterns further comprising examining the existing report for numeric patterns.

9. The method of claim 1, wherein the report is generated using a selection in an application.

10. A computer storage medium comprising computer executable instructions for transforming a report from a first version to a second version, the computer instructions comprising instructions for:
   exporting existing report objects in an existing first version report into XML format to a transformation tool;
   in the transformation tool,
      detecting a report type for the existing first version report;
      detecting mini-patterns within the existing first version report wherein
      detecting mini-patterns further comprises one selected from the group comprising:
         examining parent-child relationships within the existing report and comparing the parent-child relationship to known parent-child relationships to determine if the parent-child relation ship relationship is similar to a known parent-child relationship;
         examining the headings within the existing report to determine if the headings match any known headings;
         examining the existing report for keywords to determine if the keywords match any known keywords;
         examining the existing report for calculation patterns; and
         examining the existing report for numeric patterns;
      tabularizing controls from the existing first version report;
      transforming parts of the existing first version report wherein transforming the parts of the existing first version report further comprises transforming request forms in the existing first version report into a request page;
      building an in-memory object model; and
      serializing the in-memory object model into a RDLC file in XML format.

11. The computer storage medium of claim 10, wherein detecting mini-patterns further comprises examining properties of the existing first version report and determining if the properties of the first version report are similar to properties of known reports and wherein properties of the first report version comprise at least one selected from the group comprising:
   the body of the first version report;
   the headers of the first version report; and
   the groupings of the first version report.

12. The computer storage medium of claim 10, wherein the report is generated using a selection in an application.

13. A computer system comprising a processor configured for executing computer executable instructions, a memory for storing the computer executable instructions and an input-output circuit, the computer executable code comprising instructions for transforming a report from a first version to a second version, the computer executable instructions comprising instructions for:
   exporting existing report objects in an existing first version report into XML format to a transformation tool;
   in the transformation tool,
      detecting a report type for the existing first version report;
      detecting mini-patterns within the existing first version report wherein detecting mini-patterns further comprises one selected from the group comprising:
         examining parent-child relationships within the report and comparing the parent-child relationship to known parent-child relationships to determine if the parent-child relation ship relationship is similar to a known parent-child relationship;
         examining the headings within the existing report to determine if the headings match any known headings;
         examining the existing report for keywords to determine if the keywords match any known keywords;
         examining the existing report for calculation patterns; and
         examining the existing report for numeric patterns;
      tabularizing controls from the existing first version report;
      transforming parts of the existing first version report wherein transforming the parts of the existing first version report further comprises transforming request forms in the existing first version report into a request page;
      building an in-memory object model; and
      serializing the in-memory object model into a RDLC file.

14. The computer executable instructions of claim 13, wherein detecting mini-patterns further comprises examining properties of the existing first version report and determining if the properties of the first version report are similar to properties of known reports and wherein properties of the first report version comprise at least one selected from the group comprising:
   the body of the first version report;
   the headers of the first version report; and
   the groupings of the first version report.

15. The computer executable instructions of claim 13, wherein the report is generated using a selection in an application.

* * * * *